US012566264B2

(12) United States Patent
Powe

(10) Patent No.: US 12,566,264 B2
(45) Date of Patent: Mar. 3, 2026

(54) ENHANCED RESOLUTION SPLIT APERTURE USING BEAM SEGMENTATION

(71) Applicant: CODA OCTOPUS GROUP, INC., Orlando, FL (US)

(72) Inventor: Matthew Duncan Powe, Dalgety Bay (GB)

(73) Assignee: CODA OCTOPUS GROUP, INC., Orlando, FL (US)

( * ) Notice: Subject to any disclaimer, the term of this patent is extended or adjusted under 35 U.S.C. 154(b) by 144 days.

(21) Appl. No.: 18/640,556

(22) Filed: Apr. 19, 2024

(65) Prior Publication Data

US 2025/0327922 A1 Oct. 23, 2025

(51) Int. Cl.
*G01S 15/42* (2006.01)
*G01S 15/89* (2006.01)

(52) U.S. Cl.
CPC ............... *G01S 15/42* (2013.01); *G01S 15/89* (2013.01)

(58) Field of Classification Search
None
See application file for complete search history.

(56) References Cited

U.S. PATENT DOCUMENTS 11,448,755 B2 9/2022 Pearson

OTHER PUBLICATIONS

Burguera, Antoni, Gabriel Oliver, and Yolanda González. "Range extraction from underwater imaging sonar data." 2010 IEEE 15th Conference on Emerging Technologies & Factory Automation (ETFA 2010). IEEE, 2010. (Year: 2010).*
Wang, Jinkun, Shi Bai, and Brendan Englot. "Underwater localization and 3D mapping of submerged structures with a single-beam scanning sonar." 2017 IEEE International Conference on Robotics and Automation (ICRA). IEEE, 2017. (Year: 2017).*
Kongsberg, Brochure: "Bringing Clarity to the World Below: The Complete Underwater Product Range" Kongsberg Maritime, Document No. 398737 (Sep. 2016).
Wei et al., "Obtaining 3D High-Resolution Underwater Acoustic Images by Synthesizing Virtual Aperture on the 2D Transducer Array of Multibeam Echo Sounder," Remote Sens., 11:2615 (2019).
Yang et al., "Multibeam sonar bottom detection using multiple subarrays," Oceans '97, MTS/IEEE Conference Proceedings, Halifax, NS, Canada, pp. 932-938 vol. 2 (1997).

* cited by examiner

*Primary Examiner* — Isam A Alsomiri
*Assistant Examiner* — Jonathan D Armstrong
(74) *Attorney, Agent, or Firm* — Barnes & Thornburg LLP

(57) ABSTRACT

A split aperture beamforming, reflection detection, beam segmentation, and point selection scheme for obtaining high resolution sonar images is disclosed. A sonar imaging device beamforms at a coarse horizontal and vertical resolution to create smaller signal data cuboids. Each beam is partitioned into segments based on direction of arrivals obtained through split aperture beamforming. Detected points in the cuboids are allocated to a beam segment and associated direction of arrival.

20 Claims, 16 Drawing Sheets

200

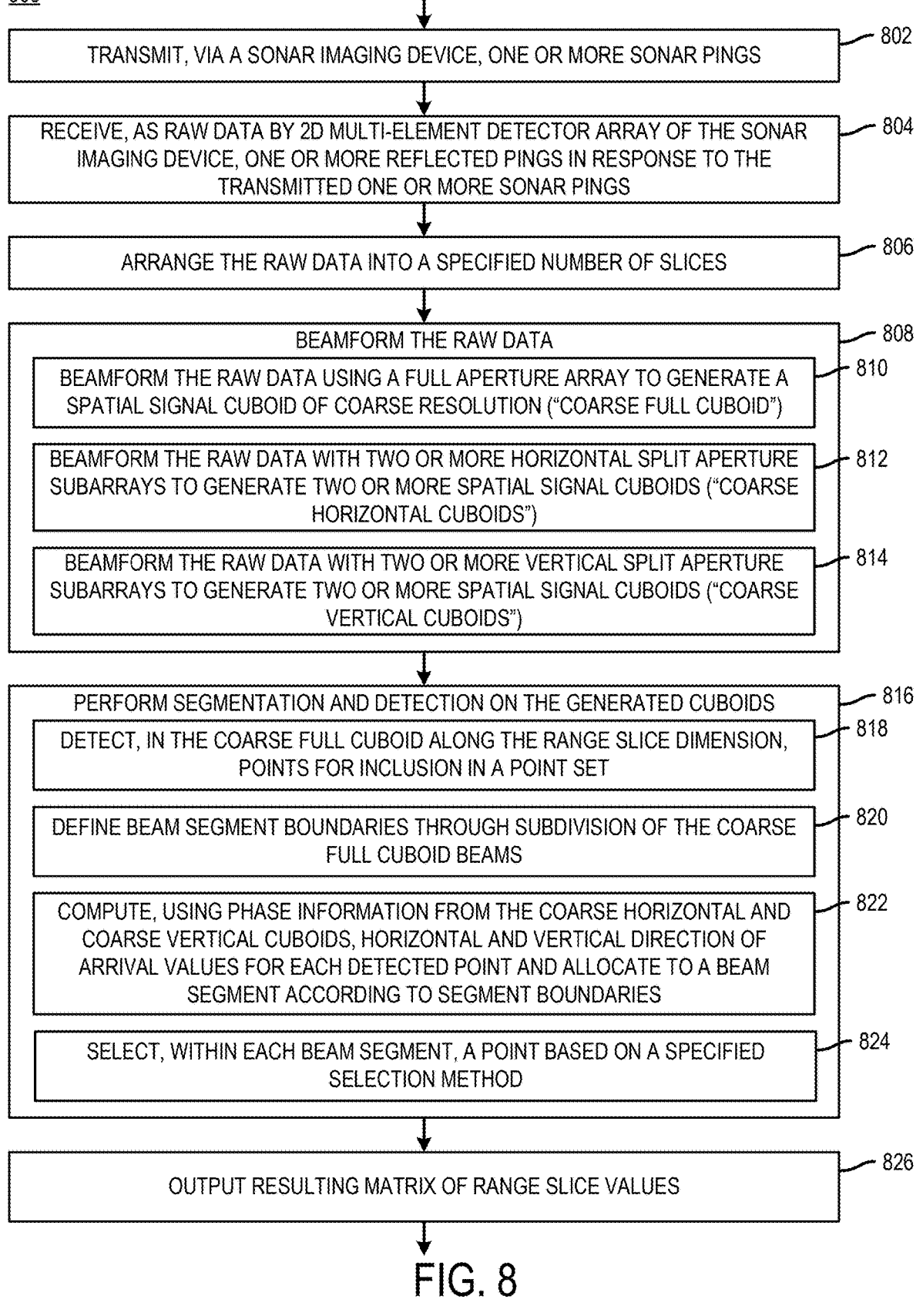

800

TRANSMIT, VIA A SONAR IMAGING DEVICE, ONE OR MORE SONAR PINGS — 802

RECEIVE, AS RAW DATA BY 2D MULTI-ELEMENT DETECTOR ARRAY OF THE SONAR IMAGING DEVICE, ONE OR MORE REFLECTED PINGS IN RESPONSE TO THE TRANSMITTED ONE OR MORE SONAR PINGS — 804

ARRANGE THE RAW DATA INTO A SPECIFIED NUMBER OF SLICES — 806

BEAMFORM THE RAW DATA — 808

BEAMFORM THE RAW DATA USING A FULL APERTURE ARRAY TO GENERATE A SPATIAL SIGNAL CUBOID OF COARSE RESOLUTION ("COARSE FULL CUBOID") — 810

BEAMFORM THE RAW DATA WITH TWO OR MORE HORIZONTAL SPLIT APERTURE SUBARRAYS TO GENERATE TWO OR MORE SPATIAL SIGNAL CUBOIDS ("COARSE HORIZONTAL CUBOIDS") — 812

BEAMFORM THE RAW DATA WITH TWO OR MORE VERTICAL SPLIT APERTURE SUBARRAYS TO GENERATE TWO OR MORE SPATIAL SIGNAL CUBOIDS ("COARSE VERTICAL CUBOIDS") — 814

PERFORM SEGMENTATION AND DETECTION ON THE GENERATED CUBOIDS — 816

DETECT, IN THE COARSE FULL CUBOID ALONG THE RANGE SLICE DIMENSION, POINTS FOR INCLUSION IN A POINT SET — 818

DEFINE BEAM SEGMENT BOUNDARIES THROUGH SUBDIVISION OF THE COARSE FULL CUBOID BEAMS — 820

COMPUTE, USING PHASE INFORMATION FROM THE COARSE HORIZONTAL AND COARSE VERTICAL CUBOIDS, HORIZONTAL AND VERTICAL DIRECTION OF ARRIVAL VALUES FOR EACH DETECTED POINT AND ALLOCATE TO A BEAM SEGMENT ACCORDING TO SEGMENT BOUNDARIES — 822

SELECT, WITHIN EACH BEAM SEGMENT, A POINT BASED ON A SPECIFIED SELECTION METHOD — 824

OUTPUT RESULTING MATRIX OF RANGE SLICE VALUES — 826

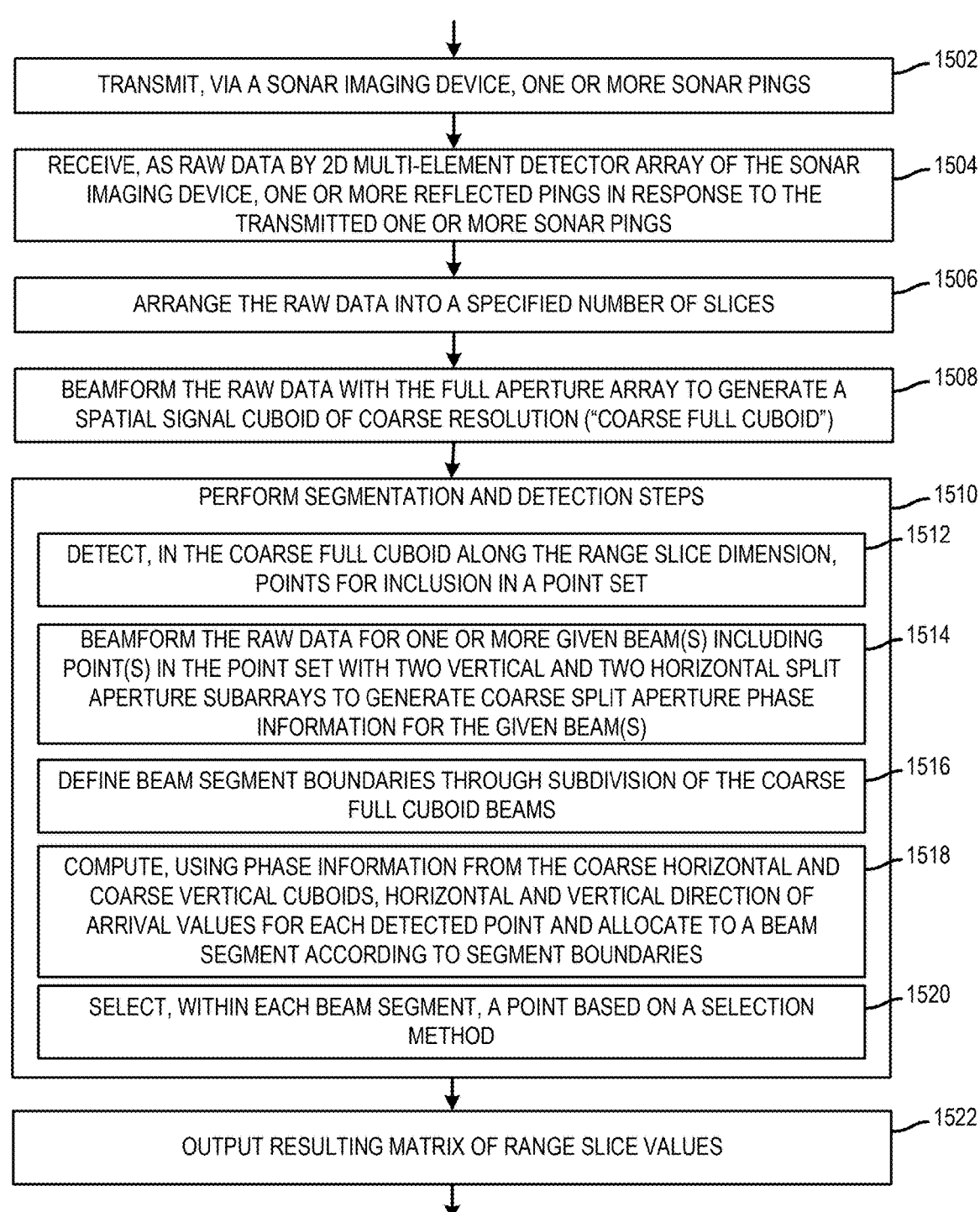

TRANSMIT, VIA A SONAR IMAGING DEVICE, ONE OR MORE SONAR PINGS — 1502

RECEIVE, AS RAW DATA BY 2D MULTI-ELEMENT DETECTOR ARRAY OF THE SONAR IMAGING DEVICE, ONE OR MORE REFLECTED PINGS IN RESPONSE TO THE TRANSMITTED ONE OR MORE SONAR PINGS — 1504

ARRANGE THE RAW DATA INTO A SPECIFIED NUMBER OF SLICES — 1506

BEAMFORM THE RAW DATA WITH THE FULL APERTURE ARRAY TO GENERATE A SPATIAL SIGNAL CUBOID OF COARSE RESOLUTION ("COARSE FULL CUBOID") — 1508

PERFORM SEGMENTATION AND DETECTION STEPS — 1510

DETECT, IN THE COARSE FULL CUBOID ALONG THE RANGE SLICE DIMENSION, POINTS FOR INCLUSION IN A POINT SET — 1512

BEAMFORM THE RAW DATA FOR ONE OR MORE GIVEN BEAM(S) INCLUDING POINT(S) IN THE POINT SET WITH TWO VERTICAL AND TWO HORIZONTAL SPLIT APERTURE SUBARRAYS TO GENERATE COARSE SPLIT APERTURE PHASE INFORMATION FOR THE GIVEN BEAM(S) — 1514

DEFINE BEAM SEGMENT BOUNDARIES THROUGH SUBDIVISION OF THE COARSE FULL CUBOID BEAMS — 1516

COMPUTE, USING PHASE INFORMATION FROM THE COARSE HORIZONTAL AND COARSE VERTICAL CUBOIDS, HORIZONTAL AND VERTICAL DIRECTION OF ARRIVAL VALUES FOR EACH DETECTED POINT AND ALLOCATE TO A BEAM SEGMENT ACCORDING TO SEGMENT BOUNDARIES — 1518

SELECT, WITHIN EACH BEAM SEGMENT, A POINT BASED ON A SELECTION METHOD — 1520

OUTPUT RESULTING MATRIX OF RANGE SLICE VALUES — 1522

FIG. 15

ENHANCED RESOLUTION SPLIT APERTURE USING BEAM SEGMENTATION

FIELD

Embodiments presented herein generally relate to sonar imaging, and more specifically, to a split aperture beamforming, reflection detection, beam segmentation, and point selection method for efficiently obtaining high resolution sonar images.

BACKGROUND

A sonar generator may produce sonar imaging data by sending one or more sonar signal pulses into a volume of fluid, also known as insonifying the volume of fluid. Doing so causes objects within the insonified volume to reflect sound energy. One or more detector elements of a detector array may record the reflected sound energy. Generally, this process of transmitting sonar pulses, or pings, is repeated at a given frequency. Once the detector array receives reflected pings, each detector element may digitize and condition an analog electrical voltage signal to provide raw data indicative of the reflected sonar wave phase and magnitude for each detector.

Thereafter, the raw data may be spatially filtered into beamformed data, whereby several narrow beams are formed that provide gain in pre-defined directions with respect to the detector array. Beamforming generally relates to techniques for generating, from the raw data, a three-dimensional (3D) array of values (e.g., magnitude and phase) corresponding to measurements within an insonified volume for a given ping. This 3D data array or spatial cuboid is also referred to herein as full time series data or beamformed data or data in "beam space." The spatial cuboid can contain gridded data with the grid defined by spherical polar coordinates: time or range and two orthogonal angles with respect to the position and orientation of the detector array. Through further processing and optionally visualization, the spatial cuboid of full time series data may be represented in 3D polar space coordinates as a function of distance or range and of two orthogonal angles with respect to the position and orientation of detectors. With knowledge of the position and orientation of the detector array, the detected point set can be transformed into geographical (or "world space") coordinates.

The resolution of sonar images can be enhanced through the use direction of arrival measurements made using split aperture processing. However, split aperture processing can be computationally expensive which can limit sonar image quality.

SUMMARY

One embodiment presented herein discloses a method. The method generally includes receiving, by a sonar imaging device having a detector array comprising elements, raw data comprising reflected signals received by the elements. The reflected signals are reflected from one or more sonar pings. The method also generally includes beamforming, by the sonar imaging device, the raw data as received at a full aperture of the detector array at a specified coarse resolution to generate a first spatial cuboid at the specified coarse resolution, and as received at a set of two or more split aperture subarrays of the detector array displaced relative to one another along a first direction at the specified coarse resolution to generate a set of two or more second spatial cuboids at the specified coarse resolution. A direction of arrival for one or more 3D sonar data points of the first spatial cuboid is computed. The one or more 3D sonar data points for inclusion in a point set are detected in the first spatial cuboid by the sonar imaging device. For each detected point, a direction of arrival in at least the first direction to a beam segment is allocated according to one or more beam segment boundaries associated with corresponding beams of the first spatial cuboid. For each beam segment, a 3D sonar data point is selected by the sonar imaging device. A range matrix representing the point set is output.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 8 is a simplified flow diagram of a method for a beamforming, detection, and segmentation scheme to obtain an enhanced resolution sonar 3D point set;

FIG. 15 is a simplified flow diagram of another embodiment of a method for a beamforming, detection, and segmentation scheme to obtain an enhanced resolution sonar 3D point set;

DETAILED DESCRIPTION OF THE DRAWINGS

Figure 1:
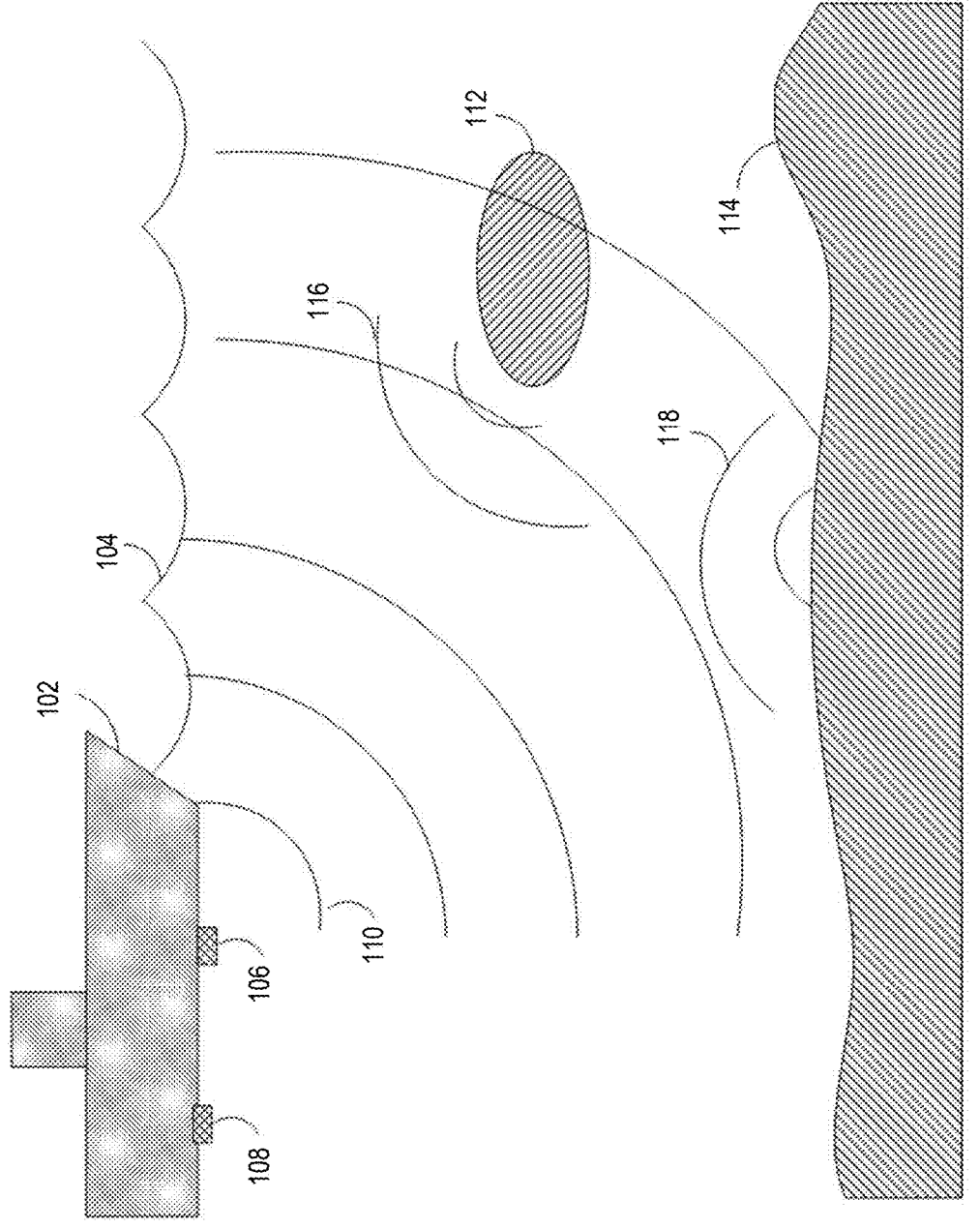
FIG. 1 is a simplified conceptual diagram of at least one embodiment of an example underwater environment in which sonar imaging data is processed.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A sonar imaging device may include a two-dimensional (2D) multi-element detector array that obtains an amount of raw data underwater in response to a transmission of sonar pings into the underwater volume. The sonar imaging device may, for example, prior to transmitting the data to a vessel system (e.g., for visualization or storage), preprocess the data using beamforming. Beamforming the data may create full time series data (or "beamformed data") that represents the underlying data volume of the space in front of a sonar sensor, in which the data volume is segmented into a regularly spaced three-dimensional grid of voxels. Each voxel is identified by its coordinates in a three-dimensional space and includes a value or values, e.g., of phase and magnitude at its center. This grid of voxels can be subdivided into slices, each slice representative of the data received by the 2D multi-element detector array at a given time. The full time series beamforming process may yield a number of beams, each including multiple data points associated with multiple voxels in multiple slices per beam. Further, sonar imaging can be enhanced using split aperture processing (in which the detector array can be subdivided into two or more sets of subarrays along specified directions for use in additional beamforming to enable direction of arrival usage in point detection) to better identify and correct errors that arise out of beamforming, such as errors in angular positions of underlying data points.

Generally, beamforming operations, particularly when incorporating split aperture processing, are computationally expensive. Beamforming incorporating split aperture processing generates a signal data cuboid from the full 2D multi-element detector array and may yield four (4) or more cuboids in split aperture-based beamforming. The sonar imaging device may parse the cuboid(s) (e.g., along a range slice dimension, range direction, a time direction, etc.) to detect points for inclusion in a 3D sonar point set from which a sonar image is generated. The sonar imaging device may, given known change in position and orientation of the detector array, mosaic multiple 3D sonar point sets from successive pings to form a 3D point cloud representing the spatial distribution of objects or features underwater. However, a sonar imaging device may be subject to hardware limitations (e.g., processing power, memory, storage, etc.). Consequently, the intensive computing resource demands of beamforming incorporating split aperture processing may place a strain on the sonar imaging device and limit performance aspects, such as in ping rate and sonar image quality.

Embodiments of the present disclosure provide a system architecture and approach for reducing computational burden associated with beamforming techniques, thereby resulting in sets of 3D data points that yield relatively high quality sonar images for a given processing power capability or processing resource. As further described herein, the sonar imaging device may beamform at a coarse horizontal and vertical resolution, which results in relatively smaller signal data cuboids (e.g., of size 64×64×800) being generated. The sonar imaging device may partition each beam-a one-dimensional (1D) array for given horizontal and vertical cuboid indices-into beam segments based on horizontal and vertical direction of arrivals obtained from the split aperture processing. The sonar imaging device may detect points for inclusion in a data set and allocate each of the detected points to a fine beam segment and associated direction of arrival. The present approach defers direction of arrival calculations to the point detection stage so that only point above a given power threshold is subject to computationally expensive arrival angle determination, thereby reducing overall computational burden to the sonar imaging system. In addition, the approach may be modified such that the sonar imaging device defers split aperture beamforming to the point detection stage to further reduce the computational burden.

Referring now to FIG. 1, an example underwater environment 100 in which sonar imaging data is obtained and processed is shown. Illustratively, FIG. 1 depicts a sea vessel 102 atop an ocean 104. The sea vessel 102 may be embodied as any water vehicle capable of traveling a body of water, such as the ocean 104. The sea vessel 102 includes a number of sound navigation and ranging (SONAR) equipment, such as a sonar generator 106 and a detector 108. In an embodiment, the detector 108 may correspond to a multi-element detector array. Although depicted as separate components, the sonar generator 106 and detector 108 may be incorporated into a single sonar imaging device. The sonar imaging device may be adapted to a variety of settings, such as being attached to a cable or wire from the sea vessel 102, embodied within a robot, embodied within a remotely operated vehicle, and the like. Further, the sonar imaging device (and individual components such as the sonar generator 106 and the detector 108) may include communication circuitry to send data collected and processed (e.g., segmentation data) to a remote device, such as a management console located within the sea vessel 102.

In an embodiment, the sonar generator 106 produces a sonar pulse. Illustratively, the sonar generator 106 insonifies a volume of fluid by transmitting a series of sound waves 110 at a given frequency in a relatively conical shape. The pulses of the sound waves 110 are generally short (e.g., within a range of 10 to 100 microseconds) and spread relatively broadly over an angular range. The sonar equipment of the sea vessel 102 may derive raw imaging data representing an underwater scene from signals reflected by objects in the sea and received by the detector 108. Objects within range of the sound waves 110, such as a suspended object 112, seabed 114, or objects buried under the seabed 114 may reflect the sound waves, shown as sound waves 116 and 118 for the suspended object 112 and the seabed 114, respectively. Sound waves may also be re-reflected from the water surface of the ocean 104. Generally, a reflected ping signal (e.g., corresponding to sound waves 116 or 118) may arrive at the detector 108 in approximately twice the time taken for a ping signal (e.g., corresponding to sound waves 110) to travel to an object in the insonified volume. A measurement of time continues until the time the reflected ping signal of a furthest object of interest is estimated to reach the detector 108. The total measurement time may be subdivided into time slices at fixed intervals, and the interval may be set to match a predetermined range resolution and a corresponding temporal resolution, $t_s$. Once the detector 108 receives reflected ping signals, each detector element may digitize and condition an analog electrical voltage signal to provide raw data representing reflected sonar wave phase and magnitude in each time slice.

Each signal received at each element of the receive array is sampled and down-converted to baseband to give a time series of complex (real and imaginary) samples. The sum of the squares of the real and imaginary parts provide the magnitude of the sound wave at each individual detector, and the ratio of the real and imaginary parts is the tangent of the phase angle. The detector 108 may sample the sound wave pressure with 12- or 16-bit accuracy. The reflected ping signals may be subdivided into a series of time slices having a temporal resolution, $t_s$, and a range resolution, $l_s$. While different values for a slice spacing, pulse length, and sonar wavelength may be used, in practice, a slice spacing of 3 cm, a pulse length of 7 cm, and a sonar wavelength of 4 mm may produce desired results. Each time slice is numbered from $t_1$ to $t_n$. Thus, for each time slice, the detector 108 may apply a quadrature filter and digitize the signal. Doing so generates a 12- or 16-bit imaginary number which gives the phase and magnitude of the reflected wave measured by each detector for that time slice.

The detector 108 may use beamforming techniques on the digitized data to provide points in a three-dimensional (3D) space. The beamforming techniques may return beamformed data representing a data volume. More particularly, the beamformed data, also referred to herein as full time series data, is a 3D array of values (e.g., phase, magnitude, etc.) corresponding to measurements from points contained within a given insonified volume for a given ping. Each value is associated with a given voxel in the 3D space. The 3D array may represent a roughly conical volume in world space. In some cases, the voxel data may represent mosaicked multi-ping 3D sonar data of an insonified volume, in which a voxel includes at least the number of mosaicked 3D data sets including a signal at a given region of an insonified volume.

Figure 2:
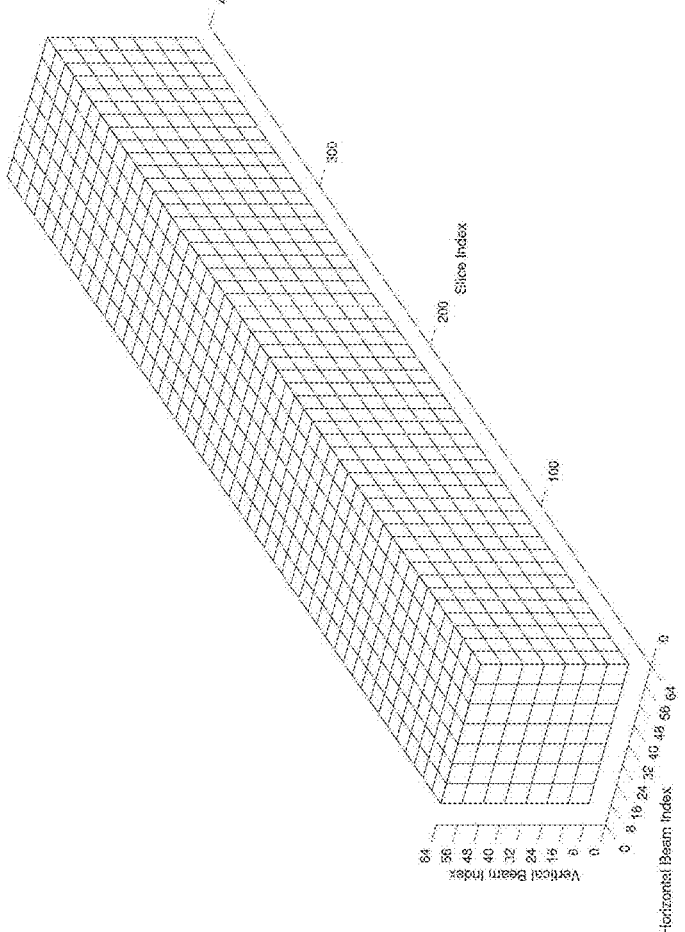
FIG. 2 is a conceptual diagram of an example spatial cuboid representation of beamformed data.

In an embodiment, the data volume may be represented as a cuboid. FIG. 2 shows an example of a cuboid 200 representing a data volume. Generally, the cuboid 200 represents a space facing the detector 108 within a given field of view (FoV$_U$ by FoV$_V$) that extends along an horizontal direction from a minimum value −FoV$_U$/2 to a maximum value FoV$_U$/2; along the vertical direction from a minimum value of −FoV$_V$/2 to a maximum value of FoV$_V$/2; and along the range direction from a minimum range Min$_{Range}$ to a maximum range Max$_{Range}$. Illustratively, the data volume is quantized in U, V and range to discrete values, splitting or segmenting the volume into a regularly spaced 3D grid of voxels, each voxel including at least one measured value (e.g., phase, magnitude, etc.) and positional information for the measured value. The voxels with the same value of range are at the same distance, which may be referred to as a "slice." The horizontal and vertical indices correspond to beam angles. Each voxel may be identified by its horizontal, vertical and range indices and a phase and a magnitude value.

Figure 3:
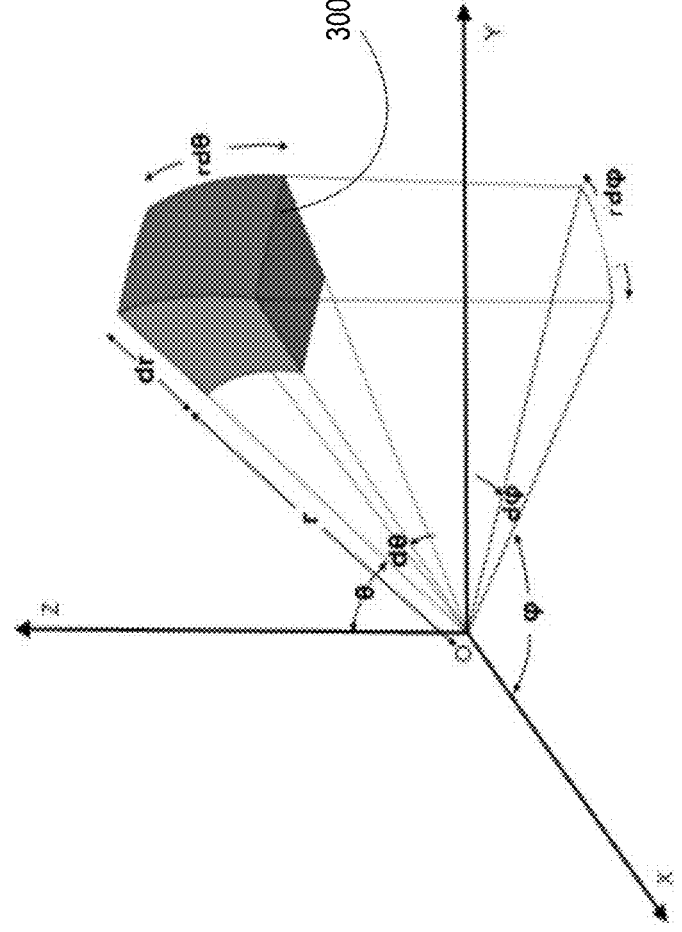
FIG. 3 is a conceptual diagram of an example spherical polar coordinate system for a three-dimensional (3D) beam space.

Further, in an embodiment, the sonar imaging device may transform the data volume depicted in cuboid 200 into world space, in which data is represented as 3D space polar coordinates as a function of range and of two orthogonal angles relative to the plane of the detector 108. Doing so allows the sonar imaging device to perform further processing and visualization with the data. Referring now to FIG. 3, a coordinate system in which one subsection of length δr having lateral dimensions r δθ and r δφ is shown. As shown, the central point of the subsection 300 is located at range r and two orthogonal angular coordinates θ and φ. In world space, volume and component subsections corresponding to voxels in volume space may be represented by 3D pyramidal frusta including truncated pyramidal sections of a sphere between two radii.

Figure 4:
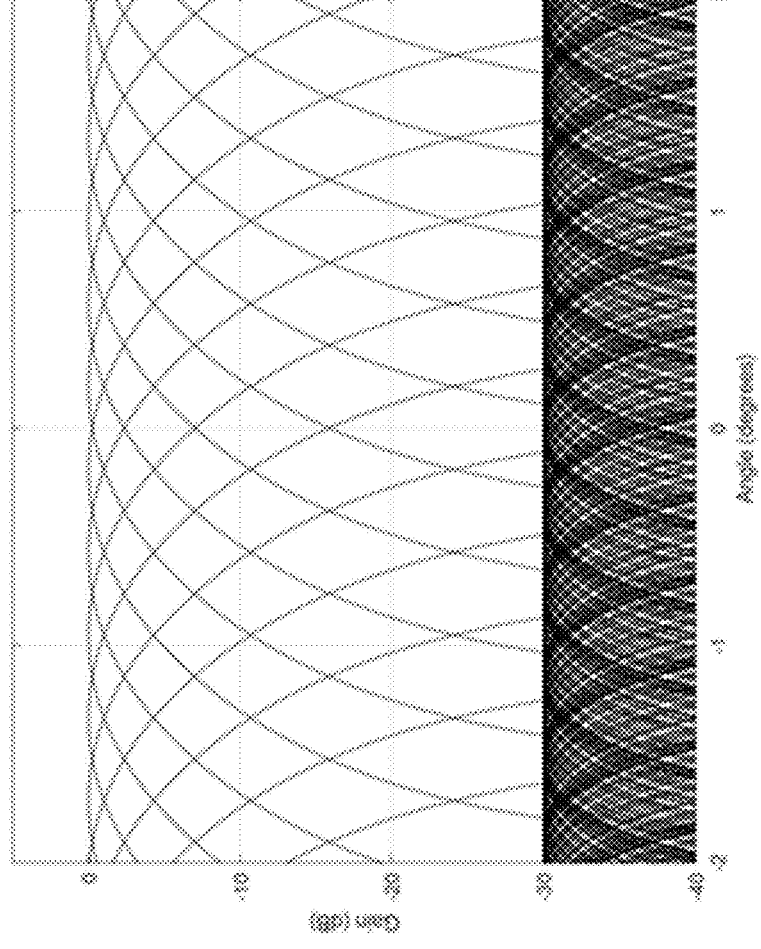
FIG. 4 is a graph depicting an example of effects of beam overlap from a large number of beams generated over a relatively small field of view.

Generally, creating a large amount of beams over a relatively small FoV can result in a significant beam overlap. Beam overlap may create computational inefficiency due to oversampling of spatial information. For example, FIG. 4 provides a graph of example beam patterns for a 48 array (with element spacing equal to wavelength) with a Dolph-Chebyshev 30 dB function to constrain beam sidelobes and with 128 beams spanning +−25 degrees. As further described herein, beamforming using data received from a 2D multi-element detector array can be performed at a lower horizontal and vertical resolution (e.g., 64×64, with little information loss) and then at an increased resolution (e.g., 128×128) at the detection stage by selecting the location of sonar data points for further processing, including visualization, based on direction of arrival information obtained through split aperture processing.

Figure 5:
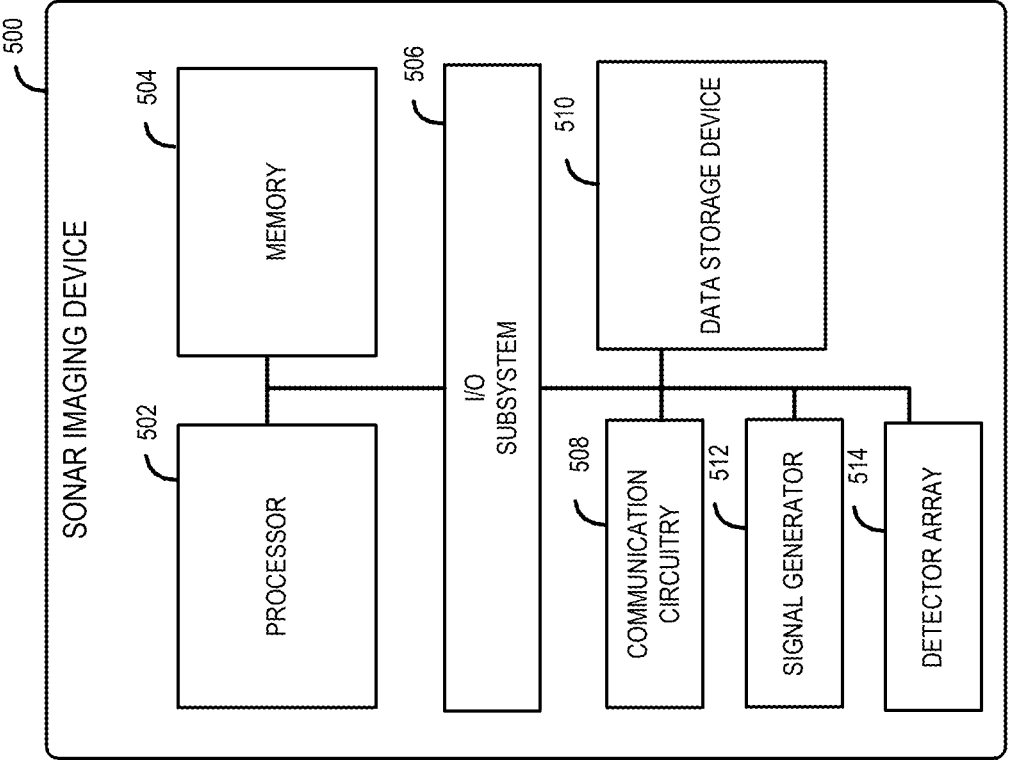
FIG. 5 is a simplified block diagram of a sonar imaging device configured to obtain an enhanced resolution sonar 3D point set based on embodiments of the present disclosure.

Referring now to FIG. 5, a sonar imaging device 500 may be embodied as any type of device capable of performing the aforementioned functions.

As shown, the illustrative sonar imaging device 500 includes a processor 502, a memory 504, an input/output (I/O) subsystem 506, communication circuitry 508, and a data storage device 510. The sonar imaging device 500 also includes a signal generator 512 and a detector array 514, which may correspond to the generator 106 and detector 108 in FIG. 1, respectively. Of course, in other embodiments, the sonar imaging device 500 may include other or additional components, such as those commonly found in a computer (e.g., display, peripheral devices, etc.) or as part of sonar equipment. Additionally, in some embodiments, one or more of the illustrative components may be incorporated in, or otherwise form a portion of, another component.

The processor 502 may be embodied as one or more processors, each processor being a type capable of performing the functions described herein. For example, the processor 502 may be embodied as a single or multi-core processor(s), a microcontroller, or other processor or processing/controlling circuit. In some embodiments, the processor 502 may be embodied as, include, or be coupled to a field programmable gate array (FPGA), an application-specific integrated circuit (ASIC), reconfigurable hardware or hardware circuitry, or other specialized hardware to facilitate performance of the functions described herein.

The memory 504 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, all or a portion of the memory 504 may be integrated into the processor 502.

The processor 502 and the memory 504 are communicatively coupled with other components of the sonar imaging device 500 via the I/O subsystem 506, which may be embodied as circuitry and/or components to facilitate input/output operations with the processor 502 and/or the memory 504 and other components of the sonar imaging device 500. For example, the I/O subsystem 506 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 506 may form a portion of a system-on-a-chip (SoC) and be incorporated, along with one or more of the processor 502, the memory 504, and other components of the sonar imaging device 500.

The communication circuitry 508 may be embodied as any communication circuit, device, or collection thereof, capable of enabling communications over a network between the sonar imaging device 500 and other devices (e.g., a management console on the sea vessel 102). The communication circuitry 508 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the communication circuitry 508 may include a network interface controller (NIC, not shown), embodied as one or more add-in-boards, daughtercards, controller chips, chipsets, or other devices that may be used by the sonar imaging device 500 for network communications with remote devices. For example, the NIC may be embodied as an expansion card coupled to the I/O subsystem 506 over an expansion bus such as PCI Express.

The illustrative data storage device 510 may be embodied as any type of devices configured for short-term or long-term storage of data such as, for example, memory devices and circuits, memory cards, hard disk drives (HDDs), solid-state drives (SSDs), or other data storage devices. The data storage device 510 may include a system partition that stores data and firmware code for the data storage device 510. The data storage device 510 may also include an operating system partition that stores data files and executables for an operating system.

The signal generator 512 may be embodied as any type of device or circuitry capable of generating sonar pulse signals and transmitting the sonar pulse signals in a physical space. The detector array 514 may be embodied as any type of device or circuitry capable of receiving signals reflected by objects in response to contact with the generated sonar pulse signals. The detector array 514 may include a two-dimensional array of detector elements (e.g., hydrophones) arranged in a grid, e.g., a 48×48 grid comprising approximately 2,304 receive elements. Although depicted as separate components, the signal generator 512 and detector array 514 may be incorporated into a sonar equipment device housed within the sonar imaging device 500.

The sonar imaging device 500 may establish an environment during operation in which the functions described herein are performed. The environment includes logic that may be carried out by one or more components of the sonar imaging device 500 by execution of the processor 502, such as the signal generator 512, detector array 514, and memory 504.

As stated, the sonar imaging device 500 may perform beamforming at a lower (also referred to herein as "coarse") horizontal and vertical resolution and then increased in resolution at the detection stage based on direction of arrival information obtained from split aperture processing. For example, a lower resolution beam can be partitioned into four segments (e.g., 2×2 horizontal and vertical direction of arrival zones), and detection can be performed on each segment. A low resolution beam may be filtered to extract points having a direction of arrival within an enhanced higher resolution beam segment.

One of skill in the art will recognize that the embodiments of the present disclosure may be carried out by other types of systems, such as those that do not incorporate sonar components. For example, the processor 502 and other non-sonar components may reside on a system separate from the signal generator and detector array. In such an embodiment, the communication circuitry may enable communications between the system and another system housing sonar components such as the signal generator and detector array (e.g., to receive raw signal data from the sonar components). In addition, although sonar is used as a reference example of a technology that may incorporate the embodiments of the present disclosure, one of skill in the art will recognize that the techniques disclosed herein may also be adapted towards other imaging technologies, such as ultrasound and imaging radar. Ultrasound imaging, e.g. used for medical imaging, closely matches the sonar technology: higher acoustic frequencies are likely to be used. In the radar case, employing radio frequency signals and antennas, application areas include automotive autonomous driving. Doppler (and therefore reflection source relative velocity) are likely addition outputs of such radar systems obtained through processing successive pings (or chirps). The embodiments of the present disclosure could be applied, for example, to the beamform stage of such radar systems to achieve high resolution images relatively efficiently.

Figure 6:
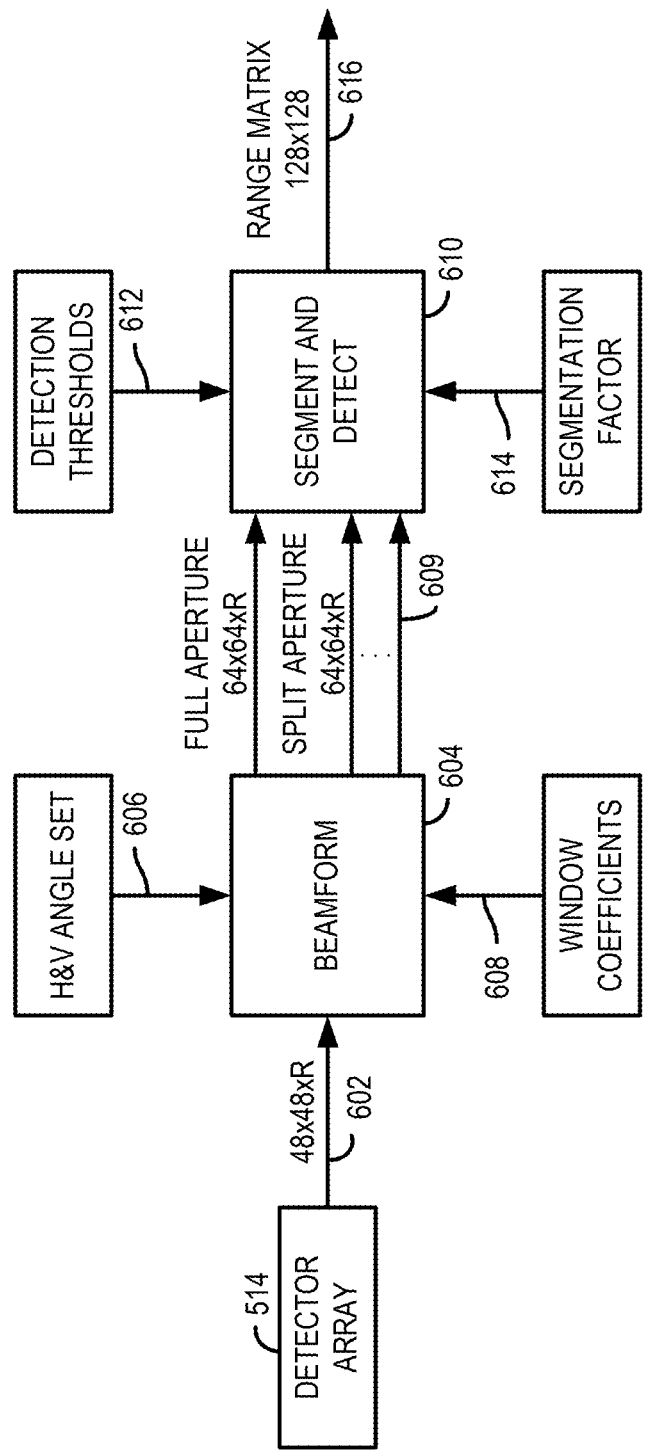
FIG. 6 is a conceptual flow diagram illustrating an architecture that may be implemented by the sonar imaging device of FIG. 5 for a split aperture beamforming, detection, and beam segmentation scheme to obtain an enhanced resolution sonar 3D point set.

FIG. 6 illustrates a conceptual block diagram of such an example architecture that can be implemented in the sonar imaging device 500. The sonar imaging device 500 may, at 604, compute the cuboid resulting from beamforming the full array aperture at a low resolution from raw signal data (at 602) from the detector array 514 (e.g., up to 48×48×R, in which R is an amount of range slices). In this example, the cuboid formed from the full aperture array is 64×64×R (at 609). Both beam and signal data can be in the form of complex numbers or phase and magnitudes. The beamform computations (at 604) are controlled by a set of horizontal and vertical pointing angles (at 606) spanning the FoV of the sonar imaging device 500 and a set of window coefficients used to limit sidelobes of each beam (at 608).

Figure 7:
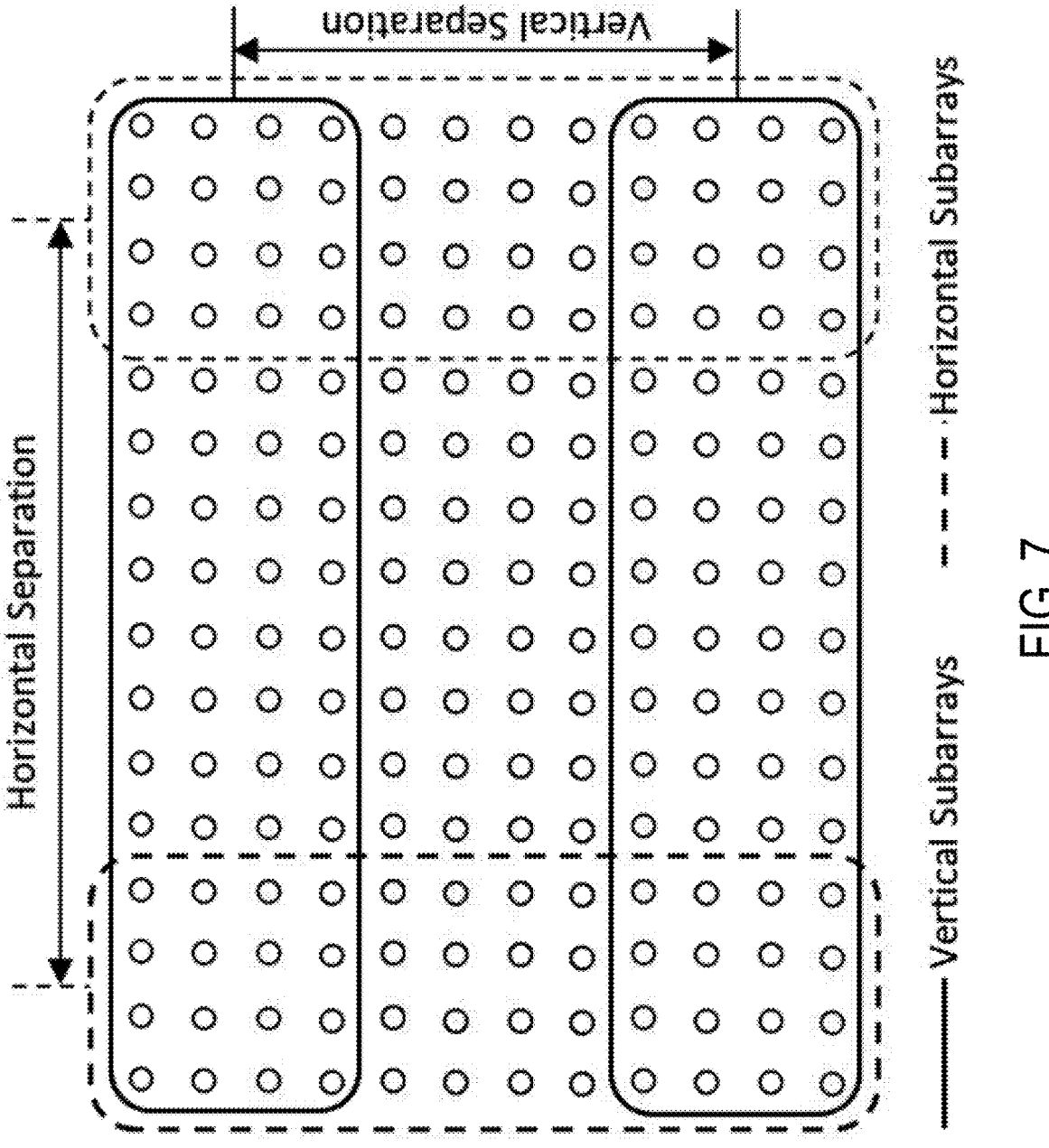
FIG. 7 is a conceptual diagram of example horizontal and vertical subarrays that may be configured during operation of the sonar imaging device of FIG. 5.

The cuboids resulting from coarse split aperture beamforming, which are also 64×64×R in this example (also at 609), are similarly formed from the horizontal and vertical subarrays. Turning briefly to FIG. 7, an example conceptualization of horizontal and vertical split aperture subarrays of the detector array 514 are shown, in which the circles represent array elements, and the solid enclosures around a subset of the array elements represent vertical subarrays and dashed enclosures represent horizontal subarrays. Illustratively, each horizontal pair is depicted as separate from one another without overlap, and similarly, each vertical pair is depicted as separate from one another without overlap. Such a depiction is to provide clarity, and one of skill in the art will recognize that in practice, subarray pairs may have a degree of overlap with one another (e.g., to further resolve direction of arrival ambiguity).

Returning to FIG. 6, the sonar imaging device 500 may conduct beam segmentation and sonar data point detection (at 610), in which the point detection and beam segmentation operations are controlled by thresholds (at 612) and segmentation factor inputs (614). The beam segmentation operation includes the computation of direction of arrival (in the horizontal and/or vertical directions). Generally, a beam segment is defined by direction of arrival boundaries. For a given beam (a 1D data series for given horizontal and vertical indices of the cuboid), a beam segment contains coarse data elements having a direction of arrival that falls within the direction of low resolution arrival boundaries. Split aperture processing provides a direction of arrival value relative to the centerline of the coarse beam, thereby enabling allocation of coarse beam data elements to beam segments (or allocation to no segments if the direction of arrival is outside of the segment boundaries). In an embodiment, the sonar imaging device 500 may further reduce computational burden of the direction of arrival estimation by processing only those elements that exceed a specified power threshold. Such elements may be considered to not be noise or sidelobe interference. Note, although in this example, 2×2 beam segmentation is performed, higher segmentation factors may also be used, such as 3×3, 4×4, and so on.

The sonar imaging device 500 may perform point detection based on different beam segment element properties. For example, an angular detection approach identifies, within each beam segment, a range of a given received signal that exceeds specified power thresholds and has the smallest direction of arrival difference from the centerline of the beam segment. As another example, an angular segmentation approach may also be used with signal power detection methods, in which the final detection is the first (i.e., shortest range slice) point or the point having maximum power.

The output of the detection process is an enhanced matrix of range slice values (at 616) with improved positional accuracy of data points. In this example, the resolution of the enhanced matrix is 128×128. The vertical and horizontal indices of the matrix relate to the horizontal and vertical angles such that the 3D relative position of each grid element can be inferred and rendered as a 3D sonar image (e.g., either alone or when mosaicked with successive matrices) by the sonar imaging device 500 (or an external image rendering application). In addition or alternatively, 3D position information may be provided for image rendering. The sonar imaging device 500, as part of the detection process, may also output corresponding matrices having signal magnitude and/or power, direction of arrival data, and/or full array phase angle data.

Referring now to FIG. 8, the sonar imaging device 500, in operation, performs a method 800 for segmented split aperture beamforming according to the embodiments described herein. As shown, the method 800 begins in block 802, in which the sonar imaging device 500 transmits one or more sonar pings into an underwater volume. In block 804, the sonar imaging device 500 receives, as raw data from the detector array 514, one or more reflected pings in response to the transmission of sonar pings. The raw data may, for example, have dimensions 48×48×R, in which R corresponds to range slices.

In block 806, the sonar imaging device 500 arranges the raw data into a specified amount of slices. In block 808, the sonar imaging device 500 beamforms the raw data. More particularly, in block 810, the sonar imaging device 500 beamforms the full aperture at a coarse resolution (e.g., a relatively lower resolution, such as 64×64×R, compared to higher resolutions such as 128×128×R, in which R corresponds to range slices) to generate a spatial signal cuboid of a coarse resolution (also referred to for the purposes of this method 800 as a "coarse full cuboid"). In block 812, the sonar imaging device 500 beamforms the raw data of two or more horizontal split aperture subarrays, which results in the generation of two or more spatial cuboids (also referred to for the purposes of this method 800 as "coarse horizontal cuboids"). In block 814, the sonar imaging device 500 beamforms the raw data of two or more vertical split aperture subarrays, which results in the generation of two or more spatial cuboids (also referred to for the purposes of this method 800 as "coarse vertical cuboids").

In block 816, the sonar imaging device 500 performs beam segmentation and point detection operations on the generated coarse full cuboid, coarse vertical cuboids, and coarse horizontal cuboids. More particularly, in block 818, the sonar imaging device 500 conducts initial filtering by detecting, in the coarse full cuboid (along the range slice dimension), one or more sonar data points to include in a data point set. For example, the sonar imaging device 500 may do so based whether a given point exceeds a specified power threshold, sidelobe threshold, and the like. In block 820, the sonar imaging device 500 defines beam segment boundaries based on division of the coarse full cuboid beams by an integer multiple beam segmentation factor f, which results in a specified number of subdivisions per beam, such as 2×2, 3×3, or 4×4 segmentations. In an embodiment, the subdivision of beams is square, though other shapes may be used (e.g., rectangular, hexagonal, etc.). Further, in an embodiment, the beam subdivision is tessellated. In block 822, the sonar imaging device 500 computes, using phase information from the coarse horizontal and coarse vertical cuboids, horizontal and vertical direction of arrival values for each detected point. This deferment of the direction of arrival computation to after point detection significantly reduces the computational burden, however a baseline architecture is for the directions of arrival to be computed for the entire coarse cuboid. The sonar imaging device 500 allocates the direction of arrival to a beam segment according to the segment boundaries.

In block 824, the sonar imaging device parses the data points within each beam segment to select a point (or multiple points) based on a given selection method. For example, the selection method may pertain to a direction of arrival (e.g., nearest to the centerline of the beam segment). In such a method, the elements within the segment are parsed, and the element that minimizes a magnitude of the segment direction of arrival residual is selected. One variant to this method is to return the first element having a magnitude of the direction of arrival residual that is less than a specified amount (e.g., one quarter) of a specified threshold, in which the search is conducted with ascending range. As another example, the selection method may pertain to power (e.g., First Above Threshold (FAT) in which the first valid point to exceed a power threshold or direction of arrival residual minimization, or a valid element with maximum power (MAX)). The range matrix contents when employing the FAT/MAX method, is ultimately selecting points based on a combination of signal properties: the initial direction of arrival filtering associated with beam segmentation and signal power. Without segmentation (or a segmentation factor of one), the FAT/MAX method still selects points based on direction of arrival and power.

Figure 10:
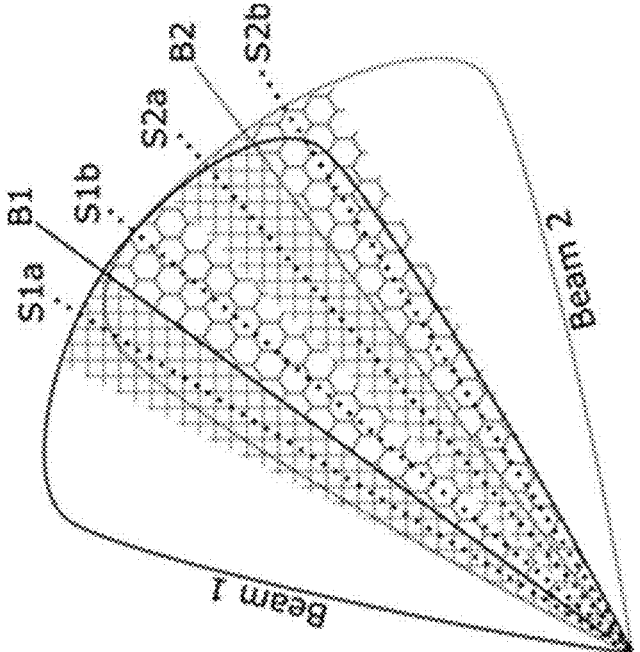
FIG. 10 is a conceptual diagram of an example beam segmentation on a pair of two-dimensional (2D) coarse beams.
Figure 11A:
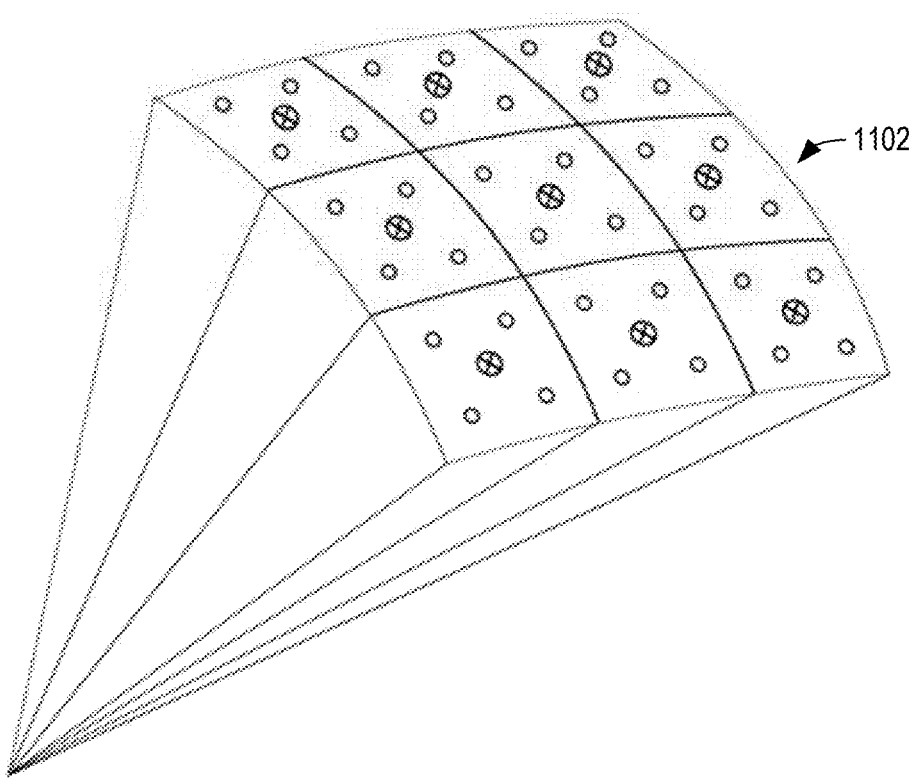
FIGS. 11A and 11B are conceptual diagrams of example beam segmentations on a pair of three-dimensional (3D) coarse beams.
Figure 11B:
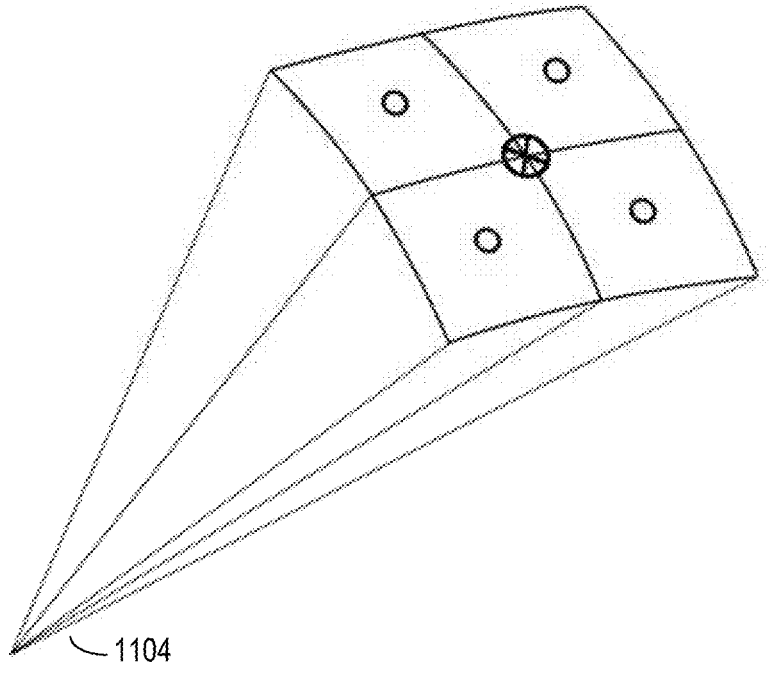
Figure 12:
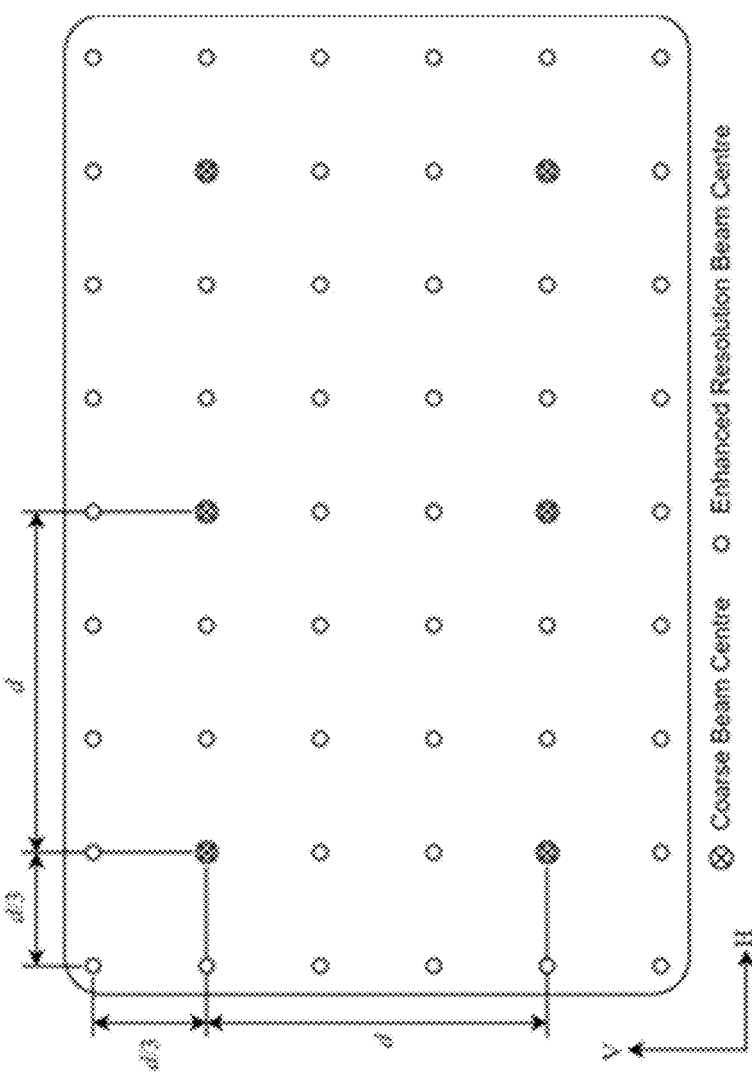
FIG. 12 is a conceptual diagram of 3×3 segmentation dimensions for the example beam segmentation of FIG. 11.
Figure 13:
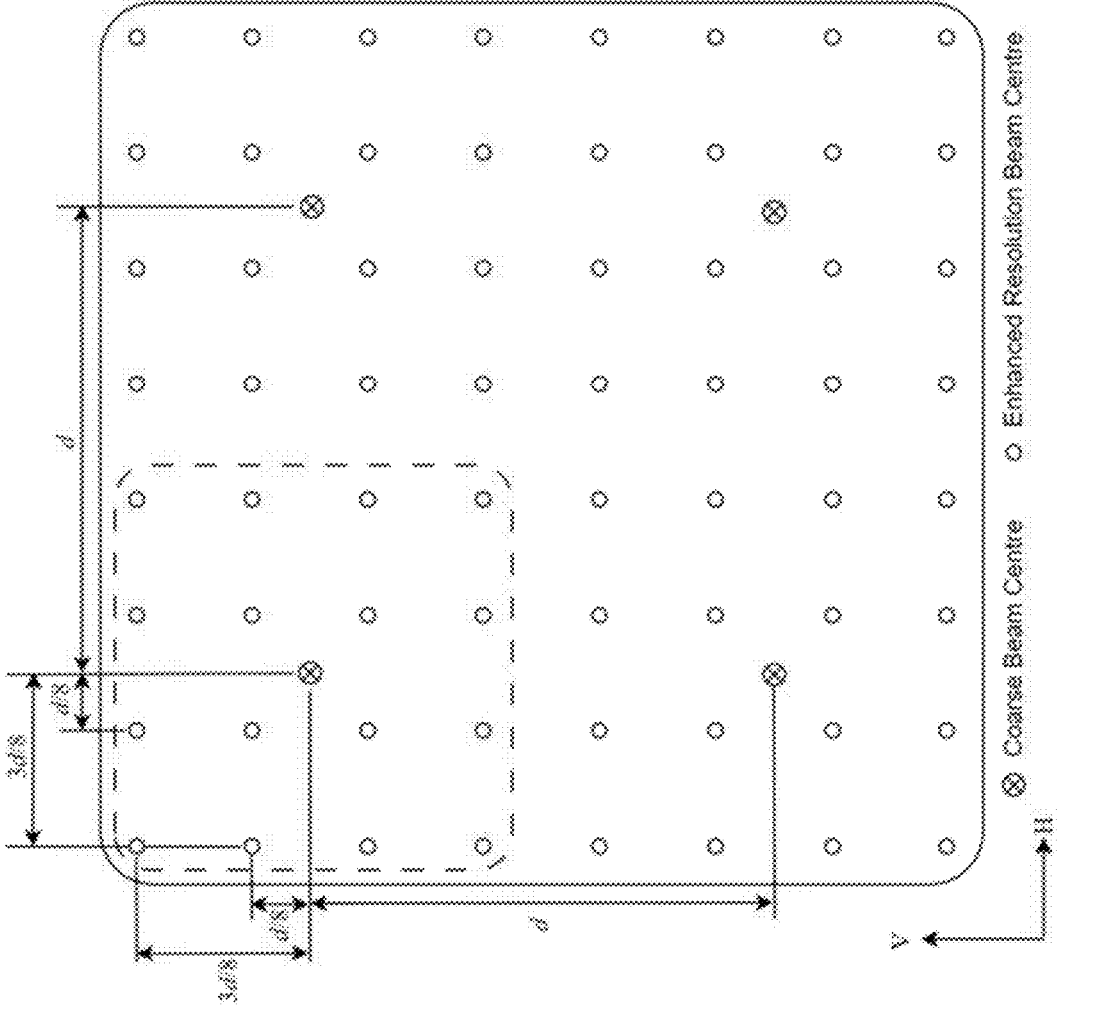
FIG. 13 is a conceptual diagram of 4×4 segmentation dimensions for the example beam segmentation of FIG. 11.

For example, turning briefly to FIG. 10, consider a pair of coarse beams, Beam 1 and Beam 2 having centerlines B1 and B2. In such an example, the sonar imaging device 500 may partition each beam into two segments with centerlines (i.e., enhanced resolution beam centers) S1*a/b* and S2*a/b*. The segments are positioned in a regular array with full angular coverage without overlap. Further, embodiments may be extended to 3D beams, as shown briefly in FIGS. 11A and 11B, in which the solid white circles depict enhanced resolution beam centers and the marked circles (⊗) represent a coarse beam centers. FIG. 11B depicts a single coarse beam 1104 with 2×2 segment boundaries, FIG. 11A depicts a 3×3 grid 1102 of coarse beams and the corresponding 2×2 segmented beam centers. Further, the segmentation may be extended to other segmentation factors. For example, FIG. 12 depicts 3×3 segmentation dimensions, and FIG. 13 depicts 4×4 segmentation dimensions (i.e., vertical and horizontal angles, or sine of angles, in which d corresponds to an angle measure). In addition, the segmentation factor may be different along the split aperture directions (e.g., 2×3, 3×2, etc.).

Generally, the detection process (in which the sonar imaging device 500 selects one or more points within each beam segment for display in a sonar image) is subject to specified signal power thresholds and angle of arrival thresholds. Each coarse beam is a 1D array that includes time (or range) series of signal magnitudes and phase (or complex numbers). The elements of the coarse beam are parsed to determine whether the signal power exceeds a specified power threshold and sidelobe threshold. More particularly, the power threshold may be specified to filter out and prevent false detection of points that correspond to noise. Further, the sidelobe threshold may be specified at a fixed level below a maximum power observed by the sonar imaging device 500 for a given range slice across all coarse beams. Doing so mitigates false detections of sidelobes associated with high power signals.

Further, the sonar imaging device 500, for each coarse beam array element that exceeds the specified power and sidelobe thresholds, determines angle of arrival using split aperture processing. As stated, the sonar imaging device 500 computes horizontal and vertical residual angles from the center of each coarse beam. Doing so may involve taking, as input, for a pair of subarray beams the subarray center separation distance, the phase angles for a range slice, and computing the corresponding direction of arrival of a given beam array element. For each coarse beam, the sonar imaging device 500 uses the residual angles to determine which (if any) of the corresponding segmented beams (within the same coarse beam) each coarse beam element resides.

For example, consider a coarse beam element (where coarse beam centers are separated by angle d) with horizontal and vertical residual angles of $\delta_H$ and $\delta_V$, respectively. In such an example, the vertical and horizontal residual angle matrices ($\Delta_H$ and $\Delta_V$) for a 4×4 segmentation (for example) can be computed as:

$$\Delta_H = \begin{bmatrix} -3d/8 & -d/8 & d/8 & 3d/8 \\ -3d/8 & -d/8 & d/8 & 3d/8 \\ -3d/8 & -d/8 & d/8 & 3d/8 \\ -3d/8 & -d/8 & d/8 & 3d/8 \end{bmatrix} + \delta_H,$$

-continued $$\Delta_V = \begin{bmatrix} -3d/8 & -3d/8 & -3d/8 & -3d/8 \\ -d/8 & -d/8 & -d/8 & -d/8 \\ d/8 & d/8 & d/8 & d/8 \\ 3d/8 & 3d/8 & 3d/8 & 3d/8 \end{bmatrix} + \delta_V.$$

The d/8 and 3d/8 values are related to the 4×4 segmentation geometry depicted in FIG. 13. The sonar imaging device 500 may compare the segment residual angle magnitudes with the respective threshold to determine which (if any) segments include the beam element. The threshold is specified such that all segments fully cover the FoV without overlapping (e.g., d/8 for the 4×4 segmentation case, i.e., half the segment spacing). A beam element resides in a segment if:

$$\Delta_H \odot \Delta_H < T^2 = (d/8)^2, \Delta_V \odot \Delta_V < T^2 = (d/8)^2$$

in which $\odot$ is the Hadamard product. Alternatively, a radial threshold is slightly more permissive and expressed as:

$$\Delta_H \odot \Delta_H + \Delta_V \odot \Delta_V < 2\left(\frac{d}{8}\right)^2$$

Figure 14B:
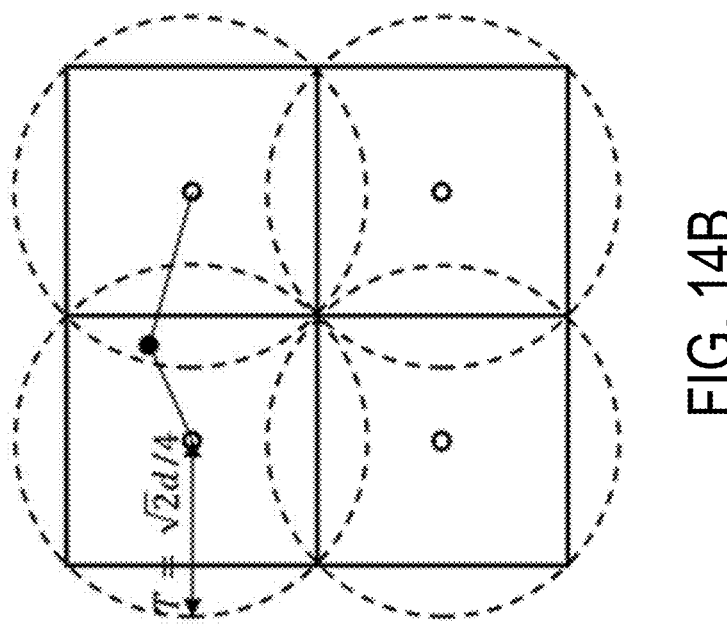
FIGS. 14A and 14B are conceptual diagrams depicting a relationship between horizontal and vertical residual angles and threshold boundaries for an example beam segmentation.
Figure 14A:
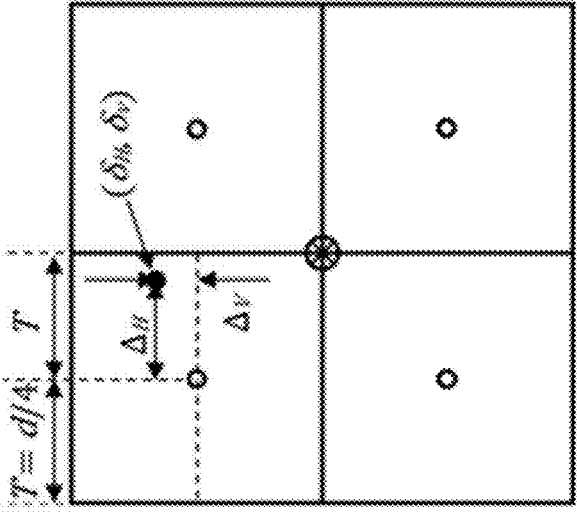

The relationship between the horizontal and vertical residual angles and threshold boundaries for the 2×2 beam segmentation case is further illustrated in FIGS. 14A and 14B, which depicts the dual horizontal-vertical (FIG. 14A) and radial (FIG. 14B) boundaries. Of course, the above technique may be applicable towards other segmentation factors discussed further above. In addition, a larger threshold may be specified, e.g., to aid normal vector computation for image rendering.

Returning to FIG. 8, in block 826, the sonar imaging device 500 outputs a matrix of range slice values. The matrix output may be used in rendering a given image of an underwater scene based on the transmitted sonar pings. As stated, multiple outputs may be mosaicked together to render the image.

Figure 9:
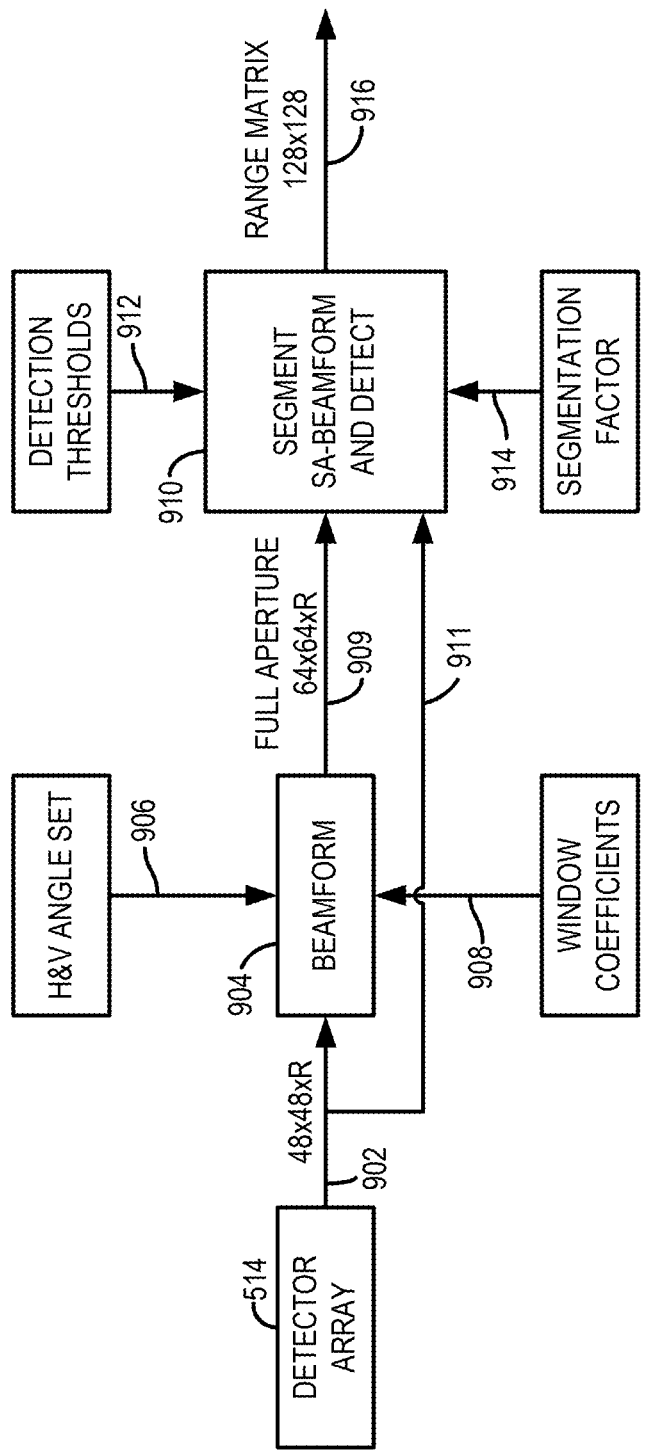
FIG. 9 is a conceptual flow diagram illustrating an alternative embodiment for an architecture that may be adapted by the sonar imaging device of FIG. 5 for a split aperture beamforming, detection, and beam segmentation scheme to obtain an enhanced resolution sonar 3D point set.

In some embodiments, the sonar imaging device 500 may be configured to delay split aperture beamforming operations to the detection stage. Doing so may significantly reduce computational burden and memory requirements associated with split aperture beamforming due to the reduction in fewer operations (relative to the example architecture of FIG. 6). FIG. 9 depicts such a configuration of the architecture in which the split aperture beamforming operations are deferred to the detection stage. Similar to the architecture of FIG. 6, the sonar imaging device 500 may, at 909, compute the cuboid resulting from beamforming the full array aperture at a low resolution from raw signal data (at 902) from the detector array 514. The beamform computations (at 904) are controlled by a set of horizontal and vertical pointing angles (at 906) a set of window coefficients used to limit sidelobes of each beam (at 908).

Following beamforming the raw data of the full aperture array, at 910, the sonar imaging device 500 conducts, on the resulting coarse full cuboid (at 909) beam segmentation, split aperture beamforming, and sonar data point detection (at 910), in which the segmentation and detection operations are controlled by threshold (at 912) and segmentation factor inputs (at 914). More particularly, following the detection operations of the coarse full cuboid, the sonar imaging device 500 may beamform the raw data for one or more given beams containing point(s) in the detected point set only with two or more vertical and two or more horizontal split aperture subarrays (at 911). Doing so generates coarse split aperture phase information for the given beams. The output of the detection process is an enhanced matrix of range slice values (at 916). In this example, the resolution of the enhanced matrix is 128×128.

FIG. 15 provides a method 1500 for the beamforming, point detection, and segmentation approach of this architecture of FIG. 9, in which split aperture beamforming is deferred to the point detection and segmentation stage. As shown, the method 1500 begins in block 1502, in which the sonar imaging device 500 transmits one or more sonar pings into an underwater volume. In block 1504, the sonar imaging device 500 receives, as raw data from the detector array 514, one or more reflected pings in response to the transmission of sonar pings (e.g., in dimensions 48×48×R).

In block 1506, the sonar imaging device 500 arranges the raw data into a specified amount of slices. In block 1508, the sonar imaging device 500 beamforms the raw data using the full aperture at a coarse resolution to generate a spatial signal cuboid of a coarse resolution (also referred to for the purposes of this method 1500 as a "coarse full cuboid").

In block 1510, the sonar imaging device 500 performs segmentation and detection steps. Particularly, in block 1512, the sonar imaging device 500 detects, in the coarse full cuboid along the range slice dimension, points for inclusion in a data point set. In block 1514, the sonar imaging device 500 conducts split aperture beamforming, or more particularly, beamforming the raw data of one or more beams including points in the point set with two vertical and two horizontal split aperture subarrays, which results in the generation of coarse split aperture phase information for the beams.

In block 1516, the sonar imaging device 500 defines beam segment boundaries based on division of the coarse full cuboid beams by an integer multiple beam segmentation factor f, which results in a specified number of subdivisions per beam, such as 2×2, 3×3, or 4×4 segmentations.

In block 1518, the sonar imaging device 500 computes, using phase information from the coarse horizontal and coarse vertical cuboids, horizontal and vertical direction of arrival values for each detected point. This deferment of the direction of arrival computation to after point detection significantly reduces the computational burden, however a baseline architecture is for the directions of arrival to be computed for the entire coarse cuboid. The sonar imaging device 500 allocates the direction of arrival to a beam segment according to the segment boundaries.

In block 1520, the sonar imaging device parses the data points within each beam segment to select a point (or multiple points) based on a given selection method (in which the selection methods have been discussed above relative to FIG. 8). In block 1522, the sonar imaging device 500 outputs a matrix of range slice values.

In an embodiment, the approach can be extended to generate more than one point per beam segment. For example, the range dimension can be partitioned into sections, and detection and the generation of a 2D range matrix may be performed for each section. The sonar imaging device 500 may also adapt techniques to detect multiple reflections within a beam at a given range (e.g., MUltiple SIgnal Classification (MUSIC)).

The approach can segment along a single axis (e.g., along the horizontal, along the vertical, or another diagonal direction). Although the terms horizontal and vertical have been used, other axes could be used which are not necessarily orthogonal. The sonar imaging device 500 may infer the world space coordinates of detected ping reflections from the beam space cuboid's nominal centerline angles, or alternatively the coordinates can be corrected using the direction of arrival measurements. The corrected world space coordinates will enhance sonar image accuracy at the expense of increased communication bandwidth between the sonar imaging device and other devices.

Figure 16A:
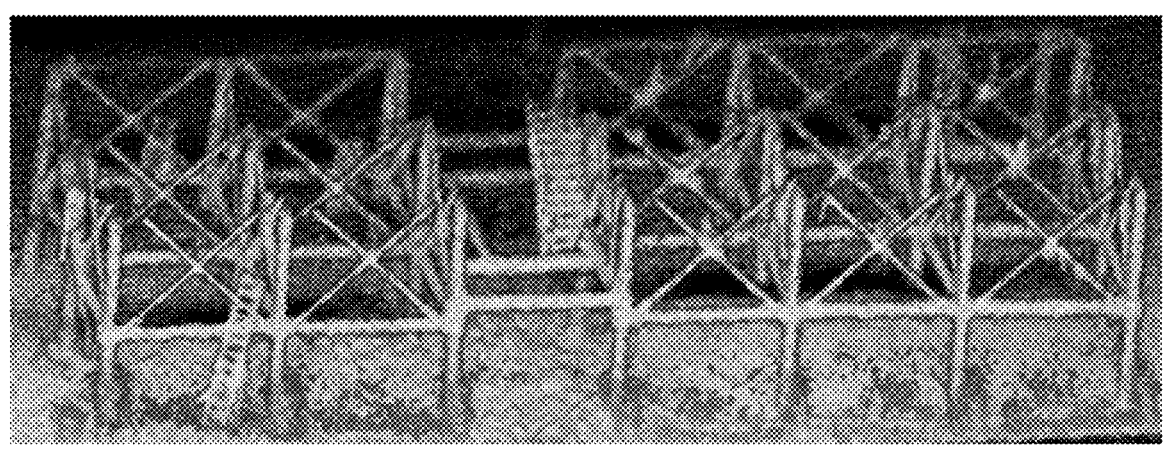
FIGS. 16A, 16B, and 16C are example mosaicked point cloud results for an underwater structure.
Figure 16B:
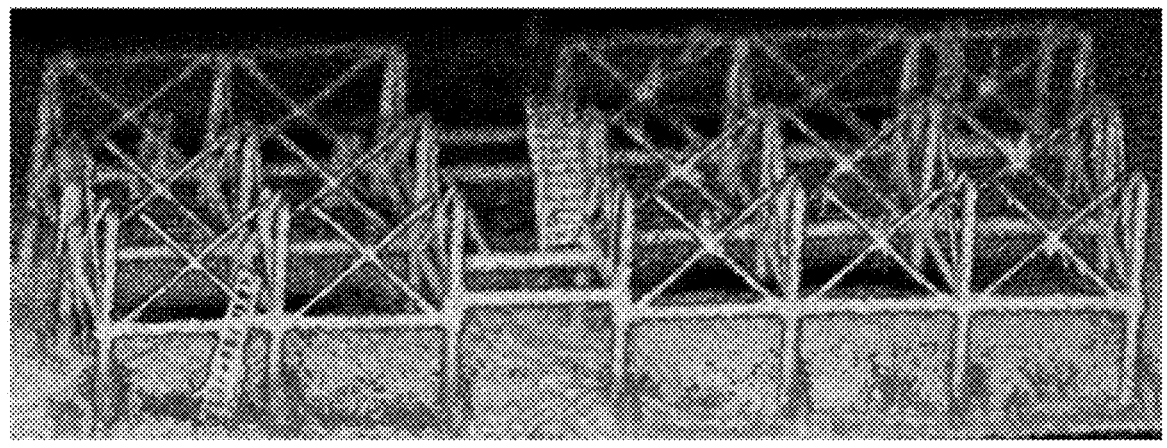
Figure 16C:
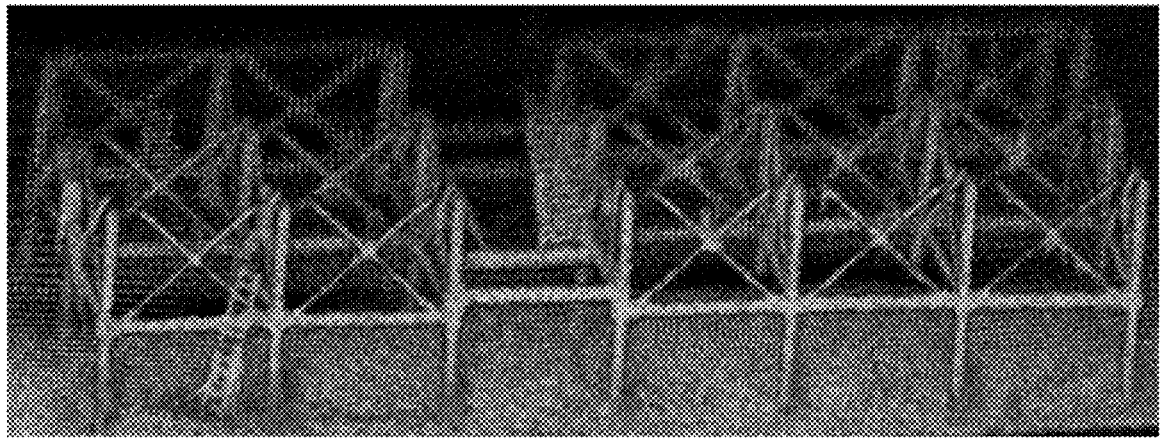

Referring now to FIGS. 16A-C, example sonar images of an underwater structure and generated from mosaicked point cloud results are shown. FIG. 16A depicts a 128×128 beam reference image of the underwater structure where split aperture processing has been employed. Similarly, FIG. 16C depicts a 64×64 beam reference image.

FIG. 16B depicts a sonar image generated from 64×64 beams with 2×2 beam segmentation using the techniques of the present disclosure (split aperture segmentation). In this example, the sonar imaging device 500 applied a direction of arrival point selection method for each of the results provided in FIGS. 16A, 16B and 16C. Illustratively, the segmented result of FIG. 16B closely matches the quality of the 128×128 reference of FIG. 16A. Advantageously, the computational time using the hardware of sonar imaging device 500 and using the architecture depicted in FIG. 6 was approximately 2.5 times less for the segmented case of FIG. 16B compared to the reference of FIG. 16A due to beam-forming. The number of detected points for the segmented case was only 6% fewer than the reference of FIG. 16A.

EXAMPLES

Illustrative examples of the technologies disclosed herein are provided below. An embodiment of the technologies may include any one or more, and any combination of, the examples described below.

Example 1 includes a computer-implemented method comprising receiving, by a sonar imaging device having a detector array comprising a plurality of elements, raw data comprising reflected signals received by the plurality of elements, wherein the reflected signals are reflected from one or more sonar pings; beamforming, by the sonar imaging device, the raw data (i) as received at a full aperture of the detector array at a specified coarse resolution to generate a first spatial cuboid at the specified coarse resolution and (ii) as received at a set of two or more split aperture subarrays of the detector array displaced relative to one another along a first direction at the specified coarse resolution to generate a set of two or more second spatial cuboids at the specified coarse resolution; computing, by the sonar imaging device and based on phase information of the two or more second spatial cuboids, a direction of arrival for one or more 3D sonar data points of the first spatial cuboid; detecting, in the first spatial cuboid by the sonar imaging device, the one or more 3D sonar data points for inclusion in a point set; for each detected point, allocating, by the sonar imaging device, a direction of arrival in at least the first direction to a beam segment according to one or more beam segment boundaries associated with corresponding beams of the first spatial cuboid; for each beam segment, selecting, by the sonar imaging device, a 3D sonar data point; and outputting, by the sonar imaging device, a range matrix representing the point set.

Example 2 includes the subject matter of Example 1, and wherein detecting the one or more 3D sonar data points comprises detecting the one or more 3D sonar data points based on whether, for each 3D sonar data point in the first spatial cuboid, a signal associated with the 3D sonar data point exceeds a power threshold.

Example 3 includes the subject matter of any of Examples 1 and 2, and wherein detecting the one or more 3D sonar data points comprises detecting the one or more 3D sonar data points based on whether, for each 3D sonar data point in the first spatial cuboid, a signal associated with the 3D sonar data point exceeds a sidelobe threshold.

Example 4 includes the subject matter of any of Examples 1-3, and wherein the selection of the 3D sonar data point is based on the direction of arrival associated with the 3D sonar data point.

Example 5 includes the subject matter of any of Examples 1-4, and wherein the selection of the 3D sonar data point is a First Above Threshold (FAT) or MAX power selection method.

Example 6 includes the subject matter of any of Examples 1-5, and wherein the computing of the direction of arrival is performed after the detecting of the one or more 3D sonar data points for inclusion in the point set.

Example 7 includes the subject matter of any of Examples 1-6, and wherein the beamforming of the raw data as received as a set of two or more split aperture subarrays and the computing of the direction of arrival are performed after the detecting of the one or more 3D sonar data points for inclusion in a point set.

Example 8 includes the subject matter of any of Examples 1-7, and further including, rendering, by the sonar imaging device and from the range matrix, a sonar image representative of the space.

Example 9 includes the subject matter of any of Examples 1-8, and wherein the detector array is in a two-dimensional (2D) configuration.

Example 10 includes the subject matter of any of Examples 1-9, and wherein beamforming the raw data further comprises beamforming the raw data as received at a set of two or more split aperture subarrays of the detector array displaced relative to one another along a second direction at the specified coarse resolution to generate a set of two or more third spatial cuboids at the specified coarse resolution, the second direction being non-parallel relative to the first direction.

Example 11 includes the subject matter of any of Examples 1-10, and wherein computing the direction of arrival for the one or more 3D sonar data points of the first spatial cuboid is further based on phase information of the two or more third spatial cuboids.

Example 12 includes the subject matter of any of Examples 1-11, and wherein the first and second directions are orthogonal relative to one another.

Example 13 includes the subject matter of any of Examples 1-12, and wherein the one or more beam segment boundaries are defined based on an integer multiple beam segmentation factor and wherein the integer multiple beam segmentation factor differs based on a direction.

Example 14 includes the subject matter of any of Examples 1-13, and wherein the two or more split aperture subarrays differ in dimensions at a given direction.

Example 15 includes the subject matter of any of Examples 1-14, and wherein the one or more beam segment boundaries are defined based on an integer multiple beam segmentation factor.

Example 16 includes the subject matter of any of Examples 1-15, and wherein at least two of the one or more beam segment boundaries are without overlap relative to one another.

Example 17 includes the subject matter of any of Examples 1-16, and wherein the one or more beam segment boundaries are defined through subdivision of the corresponding beams of the first spatial cuboid, and wherein the defined one or more beam segments are tessellated.

Example 18 includes the subject matter of any of Examples 1-17, and further including, detecting multiple reflections within the corresponding beams of the first spatial cuboid.

Example 19 includes the subject matter of any of Examples 1-18, and wherein the two or more second spatial cuboids includes the first spatial cuboid.

Example 20 includes a method comprising receiving, by execution of one or more processors, raw data comprising reflected signals received by a plurality of elements of a detector array, wherein the reflected signals correspond to reflections of at least one or more transmitted signals; beamforming the raw data (i) as received at a full aperture of the detector array at a specified coarse resolution to generate a first spatial cuboid at the specified coarse resolution and (ii) as received at a set of two or more split aperture subarrays of the detector array displaced relative to one another along a first direction at the specified coarse resolution to generate a set of two or more second spatial cuboids at the specified coarse resolution; computing, based on phase information of the two or more second spatial cuboids, a direction of arrival for one or more 3D data points of the first spatial cuboid; detecting, in the first spatial cuboid, the one or more 3D data points for inclusion in a point set; for each detected point, allocating a direction of arrival in at least the first direction to a beam segment according to one or more beam segment boundaries associated with corresponding beams of the first spatial cuboid; for each beam segment, selecting a 3D data point; and outputting a range matrix representing the point set.

The invention claimed is:

1. A computer-implemented method comprising:

receiving, by a sonar imaging device having a detector array comprising a plurality of elements, raw data comprising reflected signals received by the plurality of elements, wherein the reflected signals are reflected from one or more sonar pings;

beamforming, by the sonar imaging device, the raw data (i) as received at a full aperture of the detector array at a specified coarse resolution to generate a first spatial cuboid at the specified coarse resolution and (ii) as received at a set of two or more split aperture subarrays of the detector array displaced relative to one another along a first direction at the specified coarse resolution to generate a set of two or more second spatial cuboids at the specified coarse resolution;

computing, by the sonar imaging device and based on phase information of the two or more second spatial cuboids, a direction of arrival for one or more 3D sonar data points of the first spatial cuboid;

detecting, in the first spatial cuboid by the sonar imaging device, the one or more 3D sonar data points for inclusion in a point set;

for each detected point, allocating, by the sonar imaging device, a direction of arrival in at least the first direction to a beam segment according to one or more beam segment boundaries associated with corresponding beams of the first spatial cuboid;

for each beam segment, selecting, by the sonar imaging device, a 3D sonar data point; and outputting, by the sonar imaging device, a range matrix representing the point set.

2. The computer-implemented method of claim 1, wherein detecting the one or more 3D sonar data points comprises detecting the one or more 3D sonar data points based on whether, for each 3D sonar data point in the first spatial cuboid, a signal associated with the 3D sonar data point exceeds a power threshold.

3. The computer-implemented method of claim 1, wherein detecting the one or more 3D sonar data points comprises detecting the one or more 3D sonar data points based on whether, for each 3D sonar data point in the first spatial cuboid, a signal associated with the 3D sonar data point exceeds a sidelobe threshold.

4. The computer-implemented method of claim 1, wherein the selection of the 3D sonar data point is based on the direction of arrival associated with the 3D sonar data point.

5. The computer-implemented method of claim 1, wherein the selection of the 3D sonar data point is a First Above Threshold (FAT) or MAX power selection method.

6. The computer-implemented method of claim 1, wherein the computing of the direction of arrival is performed after the detecting of the one or more 3D sonar data points for inclusion in the point set.

7. The computer-implemented method of claim 1, wherein the beamforming of the raw data as received as a set of two or more split aperture subarrays and the computing of the direction of arrival are performed after the detecting of the one or more 3D sonar data points for inclusion in a point set.

8. The computer-implemented method of claim 1, further comprising, rendering, by the sonar imaging device and from the range matrix, a sonar image representative of the space.

9. The computer-implemented method of claim 1, wherein the detector array is in a two-dimensional (2D) configuration.

10. The computer-implemented method of claim 9, wherein beamforming the raw data further comprises beamforming the raw data as received at a set of two or more split aperture subarrays of the detector array displaced relative to one another along a second direction at the specified coarse resolution to generate a set of two or more third spatial cuboids at the specified coarse resolution, the second direction being non-parallel relative to the first direction.

11. The computer-implemented method of claim 10, wherein computing the direction of arrival for the one or more 3D sonar data points of the first spatial cuboid is further based on phase information of the two or more third spatial cuboids.

12. The computer-implemented method of claim 10, wherein the first and second directions are orthogonal relative to one another.

13. The computer-implemented method of claim 10, wherein the one or more beam segment boundaries are defined based on an integer multiple beam segmentation factor and wherein the integer multiple beam segmentation factor differs based on a direction.

14. The computer-implemented method of claim 10, wherein the two or more split aperture subarrays differ in dimensions at a given direction.

15. The computer-implemented method of claim 1, wherein the one or more beam segment boundaries are defined based on an integer multiple beam segmentation factor.

16. The computer-implemented method of claim 1, wherein at least two of the one or more beam segment boundaries are without overlap relative to one another.

17. The computer-implemented method of claim 1, wherein the one or more beam segment boundaries are defined through subdivision of the corresponding beams of the first spatial cuboid, and wherein the defined one or more beam segments are tessellated.

18. The computer-implemented method of claim 1, further comprising, detecting multiple reflections within the corresponding beams of the first spatial cuboid.

19. The computer-implemented method of claim 1, wherein the two or more second spatial cuboids include the first spatial cuboid.

20. A computer-implemented method comprising: receiving, by execution of one or more processors, raw data comprising reflected signals received by a plurality of elements of a detector array, wherein the reflected signals correspond to reflections of at least one or more transmitted signals; beamforming the raw data (i) as received at a full aperture of the detector array at a specified coarse resolution to generate a first spatial cuboid at the specified coarse resolution and (ii) as received at a set of two or more split aperture subarrays of the detector array displaced relative to one another along a first direction at the specified coarse resolution to generate a set of two or more second spatial cuboids at the specified coarse resolution; computing, based on phase information of the two or more second spatial cuboids, a direction of arrival for one or more 3D data points of the first spatial cuboid; detecting, in the first spatial cuboid, the one or more 3D data points for inclusion in a point set; for each detected point, allocating a direction of arrival in at least the first direction to a beam segment according to one or more beam segment boundaries associated with corresponding beams of the first spatial cuboid; for each beam segment, selecting a 3D data point; and outputting a range matrix representing the point set.

* * * * *